(No Model.)

T. C. LORD.
BARB FOR FENCE WIRE.

No. 293,584. Patented Feb. 12, 1884.

Witnesses:
Edwin E. Moore
John C. Dewey

Inventor:
Tyler C. Lord
By his Attorney Thos. H. Dodge

UNITED STATES PATENT OFFICE.

TYLER C. LORD, OF JOLIET, ILLINOIS, ASSIGNOR TO WASHBURN & MOEN MANUFACTURING COMPANY, OF WORCESTER, MASSACHUSETTS, AND ISAAC L. ELLWOOD, OF DE KALB, ILLINOIS.

BARB FOR FENCE-WIRE.

SPECIFICATION forming part of Letters Patent No. 293,584, dated February 12, 1884.

Application filed March 13, 1882. (No model.)

*To all whom it may concern:*

Be it known that I, TYLER C. LORD, of Joliet, county of Will, and State of Illinois, have invented certain new and useful Improvements in Barbs for Use in the Manufacture of Barbed Wire; and I do hereby declare that the following is a full, clear, and exact description of the same, reference being had to the accompanying drawings, forming a part of this specification, in which—

Figure 1:
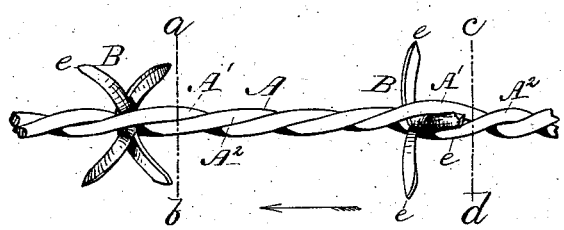
Figure 2:
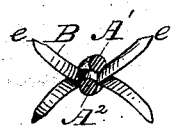
Figure 3:
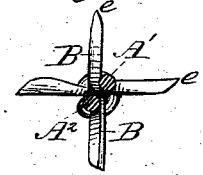
Figure 4:
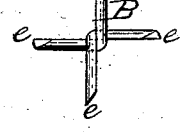
Figure 6:
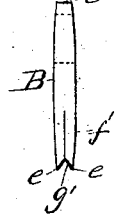
Figure 7:
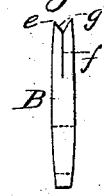
Figure 5:
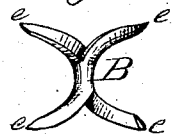

Figure 1 represents a side view of a section or piece of barbed wire embracing my said invention. Fig. 2 represents a section on line *a b*, Fig. 1. Fig. 3 represents a section on line *c d*, Fig. 1, looking in direction of arrow, Fig. 1. Fig. 4 represents an end view of my improved barb. Fig. 5 represents a perspective view of the barb shown in Fig. 4. Fig. 6 represents a side view of a piece of wire from which the barb is made, after the ends have been slitted or separated and the ends sharpened, preparatory to being bent into the position shown in Fig. 5; and Fig. 7 represents a side view of the parts shown in Fig. 6 when turned a quarter-way around.

To enable those skilled in the art to which my invention belongs to make and use the same, I will proceed to describe it more in detail.

The nature of my invention consists of an improved article of manufacture—viz., a four-pointed barb made from a short piece of wire—as will be hereinafter described.

In the drawings, the part marked A represents a section of barbed wire in which my said improved barb is shown in position for use, being held in place by the twists or cabling of the wires A' and A².

The part marked B represents the completed barb, which has four sharp points or prongs, *e*, which I prefer to make by cutting out the notch or central parts, *g* and *g'*, in the ends of the short pieces of wire B', slitting the ends, as shown at *f f'*, the slits *f f'* being made at right angles to each other, and then bending the pointed or sharpened ends *e e e e*, so that they will stand out in relation to each other, as fully shown in the drawings.

After the barbs have been made, they are fed in between the fence-wires A A', and as these are twisted or cabled the barbs are secured in place, as shown in Figs. 1, 2, and 3 of the drawings.

The barbs B may be fed in so that their bodies will stand crosswise of the fence-wires A and A', as shown on left-hand end of Fig. 1 and in Fig. 2, or lengthwise, as shown on right-hand end of Fig. 1 and in Fig. 3, the only difference being that in the former case the barb can turn, whereas in the latter it cannot.

Having described my improved barb, what I claim as my invention, and desire to secure by Letters Patent, is—

As an improved article of manufacture, the barb made from a short piece of wire split at its ends, and the prongs or sharpened ends thus formed bent out, substantially as described.

TYLER C. LORD.

Witnesses:
 THOS. H. HUTCHINS,
 WM. J. HUTCHINS.